United States Patent [19]

Stegemeyer et al.

[11] 4,334,363
[45] Jun. 15, 1982

[54] TOOL SETTING APPARATUS

[75] Inventors: Noel J. Stegemeyer, Pewaukee; Vernon W. Naker, New Berlin, both of Wis.

[73] Assignee: Kearney & Trecker Corporation, West Allis, Wis.

[21] Appl. No.: 207,256

[22] Filed: Nov. 17, 1980

[51] Int. Cl.³ .............................................. G01B 3/30
[52] U.S. Cl. .............................. 33/185 R; 33/147 R; 33/168 B; 33/181 R
[58] Field of Search ............. 33/185 R, 181 R, 147 R, 33/147 K, 147 H, 168 B, 147 E

[56] References Cited

U.S. PATENT DOCUMENTS

| | | | |
|---|---|---|---|
| 2,099,930 | 11/1937 | Emery | 33/172 R |
| 2,398,066 | 4/1946 | Whale | 33/185 R |
| 2,533,024 | 12/1950 | Lustrik | 33/185 R |
| 2,725,638 | 12/1955 | Sykes | 33/185 R |
| 2,850,807 | 9/1958 | Gasper | 33/185 R |
| 2,886,895 | 5/1959 | Kushion | 33/185 R |
| 2,886,896 | 5/1959 | Humphreyville | 33/185 R |
| 2,943,394 | 7/1960 | Shabot | 33/147 K |
| 3,047,959 | 8/1962 | Seibert | 33/185 R |
| 3,418,720 | 12/1968 | Worthen | 33/147 |
| 3,546,781 | 12/1970 | Cox et al. | 33/185 R |
| 3,826,011 | 7/1974 | D'Aniello | 33/185 R |
| 4,075,763 | 2/1978 | Yamaryo | 33/172 R |
| 4,081,910 | 4/1978 | Hammond | 33/181 R |

Primary Examiner—Willis Little
Attorney, Agent, or Firm—Cyril M. Hajewski; Robert B. Levy

[57] ABSTRACT

Apparatus for setting cutting tool length on numerically controlled machine tools includes a base having a leg extending perpendicularly therefrom. A rod is fastened to the base parallel to the leg. Overlying the end of the rod distal from the base is a cap which is reciprocal along the axis of the rod and which is biased away from the base by a spring interposed between the rod and the cap. A dial indicator gauge is fastened to the rod to abut the cap for indicating the displacement of the cap along the rod relative to the base. A setting block is pivotally mounted to the leg a known distance from the base and is rotatable about the axis of the leg for urging the cap against the spring so that the distance between the cap and the base corresponds to the known distance between the setting block and the base, to facilitate zeroing of the dial indicator gauge. Once the dial indicator gauge is zeroed, the setting block pivoted away from the cap and the cutting edge of a cutting tool is brought into contact with the cap. The tool length is set by adjusting the tool length until the dial indicator gauge reads zero.

7 Claims, 1 Drawing Figure

U.S. Patent   Jun. 15, 1982   4,334,363
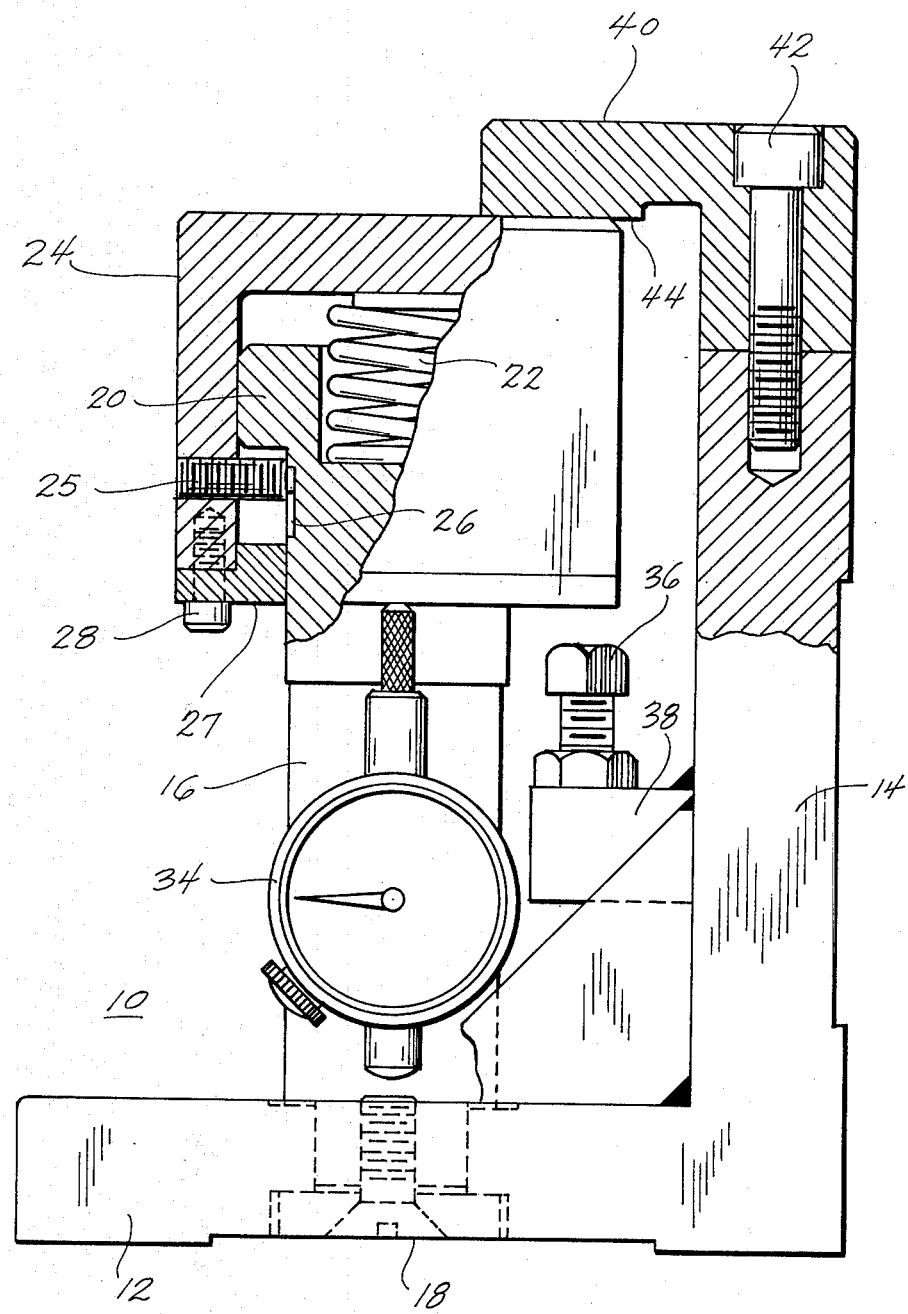

TOOL SETTING APPARATUS

BACKGROUND OF THE INVENTION

This invention relates generally to numerically controlled machine tools, and more specifically, to a device for use on numerically controlled machine tools for measuring the relative cutting tool length to facilitate tool setting or, alternatively, to facilitate compensation of the machine tool control system for cutting tool offset.

During the operation of numerically controlled machine tools, such as horizontal or vertical spindle machine tools, it is often necessary to change machine cutting tools because of tool wear or breakage or because of engineering changes. Invariably, changing the cutting tool held in the machine tool spindle causes a change in the relative tool length since the new cutting tool is likely to be shorter or longer than the tool which it replaced. To maintain workpiece accuracy, it is necessary to set the new machine cutting tool to the same length as the old one, or to compensate the machine tool control system for cutting tool offset, that is, the deviation in cutting tool length. Unless either of these steps is undertaken following replacement of a cutting tool, workpiece accuracy can no longer be maintained. Heretofore, setting of cutting tool length has required the use of stand-alone optical tool setters. Although such tool setters permit very accurate setting of cutting tool length, they are not only very bulky, but also are relatively expensive. In contrast, the present invention concerns an apparatus for setting relative cutting tool lengths which is not only inexpensive and efficient in operation, but may also be used directly on the machine tool.

It is an object of the present invention to provide an apparatus for use on numerically controlled machine tools for setting relative cutting tool length.

It is another object of the present invention to provide a simple to operate and inexpensive to fabricate apparatus for use on numerically controlled machine tools for setting cutting tool length.

BRIEF SUMMARY OF THE INVENTION

Briefly, in accordance with the preferred embodiment of the invention, an apparatus for use on numerically controlled machine tools for setting a cutting tool comprising a base having a leg formed thereto and extending perpendicularly therefrom. A rod or shaft is affixed to the base so as to be parallel to the base leg and a cap, overlying the rod end, is slidably mounted on the rod for reciprocal movement along the axis thereof, the cap urged away from the rod by a compression spring disposed between the rod end and the cap. A dial indicator gauge is fastened to the rod adjacent to the cap and is actuated by the cap to provide a visual indication of the displacement of the cap relative to the rod. A setting block is pivotally mounted on the end of the leg so as to be a predetermined distance from the bottom surface of the base and, when rotated so as to overlie the cap, the setting block limits the upward movement of the cap to establish a known distance between the top surface of the cap and the base which is sitting on the surface of the worktable. While the setting block overlies the cap, the dial indicator gauge is rotated to read zero to indicate the known distance between the top surface of the cap and the base or surface of the worktable. To set relative cutting tool length, the setting block is pivoted away from the cap to allow the spring to urge the cap upwardly and the cutting tool is then brought into contact with the cap. The tool length is adjusted until the dial indicator gauge again reads zero so that the cutting edge of the tool is now at the known distance from the surface of the worktable. Alternatively, once the dial indicator gauge has been zeroed, the tool setting apparatus of the present invention can also provide a visual indication of cutting tool offset. When the cutting tool is brought into contact with the cap, the dial indicator gauge reads the distance between the top of the cap and the setting block. Hence, the dial indicator reading is indicative of the distance between the tool tip and the surface of the worktable and can be employed to correct the machine tool control system for cutting tool offset.

BRIEF SUMMARY OF THE DRAWING

The features of the invention believed to be novel are set forth with particularity in the appended claims. The invention itself, however, both as to organization and method of operation, together with further objects and advantages thereof may best be understood by reference to the following description taken in conjunction with the accompanying drawing in which:

FIG. 1 is a front elevational view of the tool setting apparatus of the present invention.

DETAILED DESCRIPTION OF THE PREFERRED EMBODIMENT

FIG. 1 illustrates an apparatus 10 for use on numerically controlled machine tools for setting relative tool length comprising a base 12 having a leg 14 integrally formed thereto and extending perpendicularly from base 12. A shaft or rod 16 is fastened at one end to base 12 by a screw 18 so as to extend parallel to leg 14. Shaft 16 has a flanged head 20 with an axial bore in its top for receiving a compression spring 22. A hollow cap 24 overlies flanged head 20 and is urged therefrom by spring 22. A pin 25 is threaded through the wall of cap 24 to engage a slot 26 formed in the periphery of the rod to establish the limit of axial movement of cap 24 relative to rod 16 in either direction. A plate 27 is fastened by bolts 18 to the underside of cap 24 so as to overlie the opening therein and is provided with a bore for admitting the passage of rod 16 therethrough. Cap 24 and plate 27 cooperate to form a cylinder which is reciprocal along the axis of rod 16.

A dial indicator gauge 34 is secured to shaft 16 by suitable fasteners (not shown) with its spindle extending upwardly so that its end abuts plate 27 to indicate the position of plate 27 and hence cap 24. Thus, dial indicator gauge 34 provides a visual indication of the displacement of cap 24 and plate 27 relative to rod 16 and, as will be better understood hereinafter, dial indicator gauge 34 can be utilized to set the position of the cutting edge of a tool held in the spindle of a machine tool relative to the surface of a machine tool worktable. To prevent possible damage to dial indicator gauge 34 due to extended downward movement of cap 24 and plate 27, an adjustable screw 36 is threaded into an arm 38 which extends from leg 14 parallel to base 12 so as to underlie cap 24. By suitable adjustment of screw 36, the downward stroke of cap 24 and plate 26 can be limited, thereby preventing damage to dial indicator gauge 34.

A setting block 40 is pivotally mounted to the end of leg 14 by a locking bolt 42 so as to be a predetermined distance from base 12. Setting block 40 includes an overhanging arm 44 which bears against cap 24 when setting block 40 is rotated about the axis of leg 14 to overlie cap 24. Pivoting setting block 40 to position overhanging arm 44 against cap 24 causes the overhanging arm to force cap 24 and plate 27 towards base 12 against the pressure of spring 22 to establish a known distance between the top surface of cap 24 and the bottom surface of base 12 which will set upon the top surface of the machine tool worktable. By varying the length of leg 14 and the dimensions of setting block 40, the distance between the top surface of cap 24 and the bottom surface of base 12 during intervals when cap 24 is urged against spring 22 by overhanging arm 44 of setting block 40, can be altered as desired.

To measure relative tool length on a vertical spindle numerically controlled machining center, tool setting apparatus 10 is placed with base 12 on the machine tool worktable so that the axis of the cutting tool held in the machine tool spindle is in line with the axis of shaft 16. Setting block 40 is rotated so that overhanging arm 44 overlies cap 24 and then is locked in position by tightening bolt 42 to force cap 24 against spring 22. Once bolt 42 is completely tightened, the top surface of cap 24 will be at a known distance from the bottom surface of base 12. Dial indicator gauge 34 is then rotated to position the needle to indicate zero displacement. Thereafter, bolt 42 is loosened and setting block 40 is pivoted away from cap 24.

Once dial indicator gauge 34 has been zeroed, the cutting edge of the tool held in the machine tool spindle is moved against cap 24 and the cutting tool is then positioned so that the dial indicator gauge reads zero. When the dial indicator gauge reads zero, the distance between the cutting edge of the tool and the surface of machine tool worktable corresponds to the known distance between the inner surface overhanging arm 44 and the bottom surface of base 12.

Alternatively, apparatus 10 can also be employed to measure tool offset. Following initial zeroing of the dial indicator gauge, the cutting tool is brought into contact with the top surface of cap 24. The dial indicator gauge reading, indicative of the distance between the top surface of cap 24 and the inner surface of overhanging arm 44, is thus indicative of the distance between the cutting tool tip and the bottom surface of base 12. The dial indicator gauge reading can thus be employed to compensate the machine tool control system for tool offset.

Tool setting apparatus 10, although described above for use on a vertical spindle on a vertical spindle numerically controlled machining center, is equally well suited for use on horizontal spindle machines. To employ tool setting apparatus 10 to set relative cutting tool length on a horizontal spindle machine, tool setting apparatus 10 is rotated 90° so that leg 14 rests on the worktable of the horizontal spindle machine tool. Keys are then placed on the workpiece table to abut now vertically extending base 12 so that when a cutting tool is brought into contact with the top surface of cap 24, transverse movement of tool setting apparatus 10 will be prevented The foregoing describes an apparatus for use with numerically controlled machine tools for setting relative tool length. Configuring the tool setting apparatus as described above allows it to be used on the machine tool itself thereby avoiding costly stand-alone tool setting devices.

Although the illustrative embodiment of the present invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

The principles of this invention having now been fully explained in connection wih the foregoing, we hereby claim as our invention:

1. An apparatus for setting the position of a cutting tool in a machine tool comprising:
   a support having a base adapted to be placed on the worktable of the machine tool;
   an indicator mounted on said support;
   an actuator carried by said support and positioned to actuate said indicator, said actuator having a top surface that is parallel to said base and which moves in a path perpendicular to the base between a home position a known distance from the bottom surface of said base and an outward position further from said base bottom surface than said home position;
   means disposed between said actuator and the base of said support for biasing said actuator means away from said home position and away from said base;
   means attached to said indicator on said indicator when said actuator is at said home position; and
   setting means affixed to said support for movement between a first position at which said setting means engages said actuator and biases said actuator to said home position so that said top surface of said actuator is at the known distance from the bottom surface of said base and a second position at which said setting means is still in engagement with said support but disengaged from said actuator enabling said actuator to be biased towards said outer position and away from said home position and away from said base so that when the cutting edge of the cutting tool is brought into engagement with the top surface of said actuator, said actuator is forced against said biasing means until the home position is shown on said indicator wherein the cutting edge of the cutter will be the same distance from any surface engaged by said base.

2. The invention according to claim 1 wherein said actuator comprises:
   a hollow cap overlying said support;
   a plate fastened to said cap for overlying the opening thereto, said plate having a bore therethrough to receive said support; and
   means threaded into said cap parallel to said base to engage said support for limiting the axial movement of said cap and said plate relative to said support.

3. The invention according to claim 1 wherein said means for biasing said actuator away from said base comprises a spring.

4. The invention according to claim 1 wherein said setting means comprises a block having an overhanging arm parallel to said base, said block being pivotal about said support to engage said actuator.

5. The invention according to claim 1 and further comprising means for limiting the downward movement of said actuator to prevent damage to said indicator.

6. Tool setting apparatus for use on numerically controlled machine tools for setting relative tool length comprising:
- a base having a leg extending perpendicularly therefrom;
- a rod fastened to said base and extending therefrom parallel to said leg;
- a cap overlying the end of said rod distal from said base, said cap being reciprocal along the axis of said rod relative to said base;
- means for biasing said cap away from said base along said rod;
- a dial indicator gauge fastened to said rod and actuated by said cap for measuring the displacement of said cap along said rod, said dial indicator gauge being adjustable to indicate a predetermined displacement; and
- a setting block pivotally mounted to the top of said leg a known distance from said base, said setting block being rotatable about the axis of said leg to engage said cap and to urge said cap towards said base so that the distance between said cap and said base corresponds to the known distance between said setting block and said base thereby permitting said dial indicator gauge to be adjusted to indicate the known distance so that when said setting block is rotated away from said cap and a cutting edge of a cutting tool is brought into engagement to force said cap towards said back with said cap, said dial indicator gauge reads the difference of the distance between cutting edge of the cutting tool and the base from the known distance.

7. The invention according to claim 6 further including means fastened to said leg so as to underlie said cap for limiting the downward displacement of said cap along said rod.

* * * * *